US009118527B2

United States Patent
Bennett et al.

(10) Patent No.: US 9,118,527 B2
(45) Date of Patent: Aug. 25, 2015

(54) DATA DURING ANALOG AUDIO

(71) Applicant: Fairchild Semiconductor Corporation, San Jose, CA (US)

(72) Inventors: Christopher A. Bennett, Topsham, ME (US); Gregory A. Maher, Cape Elizabeth, ME (US); Brewster Porcella, Biddeford, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/049,387

(22) Filed: Oct. 9, 2013

(65) Prior Publication Data

US 2014/0105312 A1    Apr. 17, 2014

Related U.S. Application Data

(60) Provisional application No. 61/711,465, filed on Oct. 9, 2012.

(51) Int. Cl.
*H04B 3/00* (2006.01)
*H04L 25/00* (2006.01)
(Continued)

(52) U.S. Cl.
CPC ............... *H04L 27/12* (2013.01); *H04L 25/08* (2013.01); *H04L 27/106* (2013.01); *H04L 27/28* (2013.01); *H04M 11/06* (2013.01)

(58) Field of Classification Search
CPC ....... H04L 27/12; H04L 27/106; H04L 25/08; H04L 27/28; H04M 11/06; H04M 11/064; H04M 11/066; H04M 11/068
USPC ......... 375/257, 272, 219, 220, 222, 303, 334; 700/94; 329/303; 332/101, 105; 463/43
See application file for complete search history.

(56) References Cited

U.S. PATENT DOCUMENTS 3,601,710 A * 8/1971 Morra ........................... 329/303
4,379,947 A    4/1983 Warner
(Continued)

FOREIGN PATENT DOCUMENTS

CN    103716735 A    4/2014
KR    1020140045895 A    4/2014
(Continued)

OTHER PUBLICATIONS

"Chinese Application Serial No. 201320620730.2, Office Action mailed Jan. 29, 2014", w/English Translation, 3 pgs.
(Continued)

*Primary Examiner* — Phuong Phu
(74) *Attorney, Agent, or Firm* — Schwegman Lundberg & Woessner, P.A.

(57) ABSTRACT

This application discusses among other things, apparatus and method for transmitting data with an analog signal without significantly distorting the analog signal. In an example, an apparatus can include an audio channel, a capacitor coupled to a first conductor of the audio channel, the capacitor configured to couple an analog representation of a digital data signal with an analog audio signal on the audio channel, and a frequency modulator configured to receive the digital data signal and to modulate a frequency of an output signal of the frequency modulator based on a logic level of the digital data signal, wherein the analog representation of the digital data signal includes the frequency of the output signal of the frequency modulator.

18 Claims, 2 Drawing Sheets

(51) Int. Cl.
*H04L 27/12* (2006.01)
*H04L 27/10* (2006.01)
*H04L 25/08* (2006.01)
*H04L 27/28* (2006.01)
*H04M 11/06* (2006.01)

(56) References Cited

U.S. PATENT DOCUMENTS

| | | | |
|---|---|---|---|
| 4,512,013 A | | 4/1985 | Nash et al. |
| 4,670,874 A | * | 6/1987 | Sato et al. ............... 370/294 |
| 6,404,773 B1 | * | 6/2002 | Williams et al. ......... 370/463 |
| 8,299,865 B2 | * | 10/2012 | Nakamura et al. ....... 332/105 |
| 2006/0199645 A1 | * | 9/2006 | Canterbury et al. ....... 463/43 |
| 2009/0096543 A1 | * | 4/2009 | El-Agha et al. .......... 332/101 |
| 2012/0059491 A1 | * | 3/2012 | Carroll .................... 700/94 |

FOREIGN PATENT DOCUMENTS

| | | |
|---|---|---|
| WO | WO-8404216 A1 | 10/1984 |
| WO | WO-9960719 A1 | 11/1999 |
| WO | WO-2004021661 A1 | 3/2004 |

OTHER PUBLICATIONS

"Chinese Application Serial No. 201320620730.2, Response filed Mar. 18, 2014", w/English Claims, 25 pgs.

* cited by examiner

US 9,118,527 B2

DATA DURING ANALOG AUDIO

CLAIM OF PRIORITY

This patent application claims the benefit of priority, under 35 U.S.C. Section 119(e), to Bennett et al., U.S. Provisional Patent Application Ser. No. 61/711,465 entitled "DATA DURING ANALOG AUDIO," filed on Oct. 9, 2012, which is hereby incorporated by reference herein in its entirety.

BACKGROUND

With the rise in portable communication devices, opportunities to communicate data with analog signals have been considered to increase the functionality of the devices as well as other electronic devices. However, attempts for simultaneous communication of digital data with analog audio or analog video signals have been burdened with significant distortion.

OVERVIEW

This application discusses among other things, apparatus and method for transmitting data with an analog signal without significantly distorting the analog signal. In an example, an apparatus can include an audio channel, a capacitor coupled to a first conductor of the audio channel, the capacitor configured to couple an analog representation of a digital data signal with an analog audio signal on the audio channel, and a frequency modulator configured to receive the digital data signal and to modulate a frequency of an output signal of the frequency modulator based on a logic level of the digital data signal, wherein the analog representation of the digital data signal includes the frequency of the output signal of the frequency modulator.

This section is intended to provide an overview of subject matter of the present patent application. It is not intended to provide an exclusive or exhaustive explanation of the invention. The detailed description is included to provide further information about the present patent application

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized example methods and apparatus to transmit digital data during the presence of an analog signal with low total harmonic distortion. In certain examples, digital data can be transmitted along with an analog signal such as an analog audio signal without causing enough distortion in the analog audio signal that an average listener could notice.

Figure 1A:
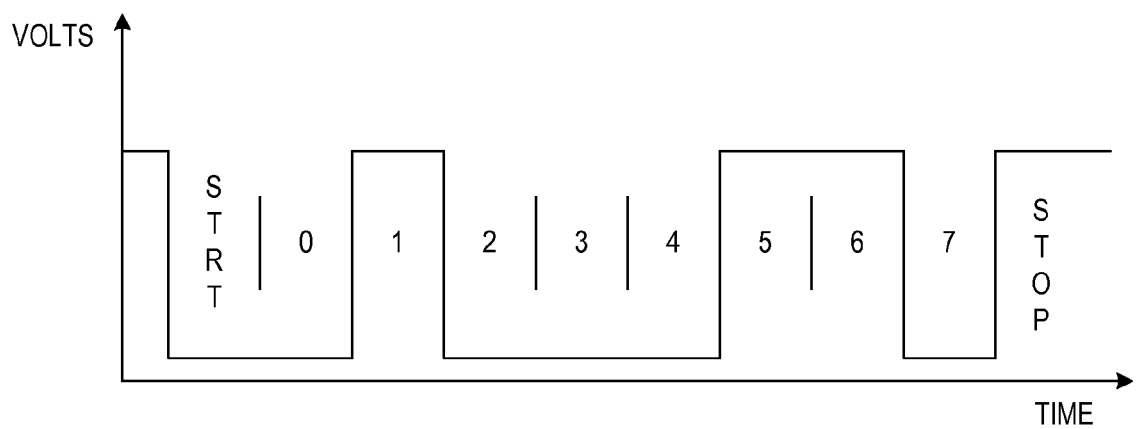
FIGS. 1A and 1B illustrate waveforms associated with transfer of a data signal with an analog audio signal according to an existing specification.
Figure 1B:
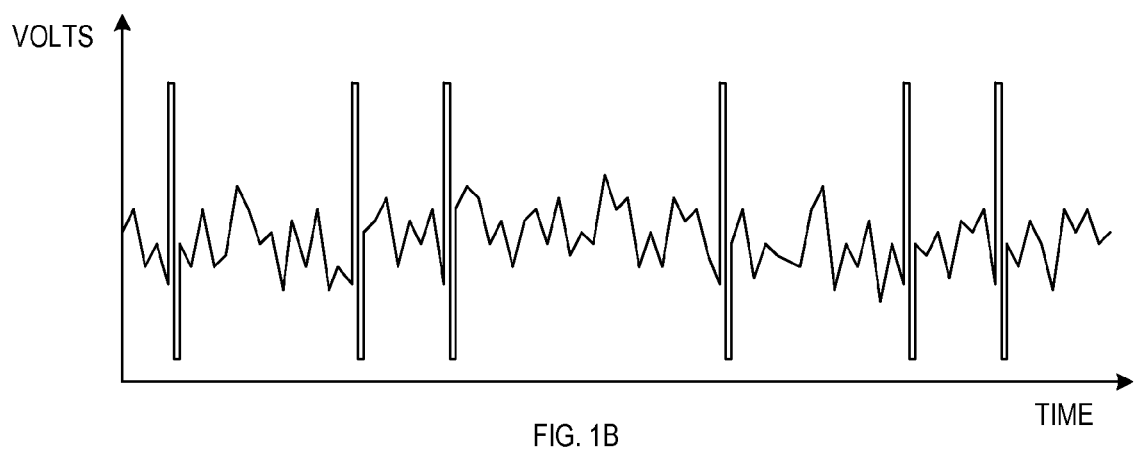

FIGS. 1A and 1B illustrate waveforms associated with transfer of an analog signal with an audio signal according to a Universal Serial Bus (USB) Carkit Specification ANSI/CEA-936-A. The specification outlines data transmission with an analog audio signal by placing data pulses with an audio signal. For example, the specification can be applied to allow mobile devices, such as mobile phones to connect to hand-free systems, chargers and other serial communication or audio devices using a USB connector, such as a mini-USB connector. From the mobile phone side, for example, the USB D− wire can be used as either the USB D− signal, a data transmit signal, the left stereo speaker audio channel, or the mono speaker audio channel, and the USB D+ wire can be used as either the USB D+ signal, a data receive signal, the right stereo speaker audio channel, or the mono microphone audio channel. FIG. 1A illustrates a graphical representation of serial data for communication using the ANSI/CEA-936-A specification. The specification allows data pulses to be place on the audio signals at a frequency within the commonly accepted audio band (20 Hz-20 kHz). A typical data rate and resulting pulses cause harmonics and DC bias distortion to the audio signal. FIG. 1B illustrates graphically the impact the data can have on an audio signal being carried by the USB D− conductor. The total harmonic distortion can be perceived by an average listener listening to a broadcast of the audio signal. In certain embodiments, a system configured according to the USB Carkit Specification ANSI/CEA-936-A can cause greater than 3% distortion to an audio signal.

Figure 2:
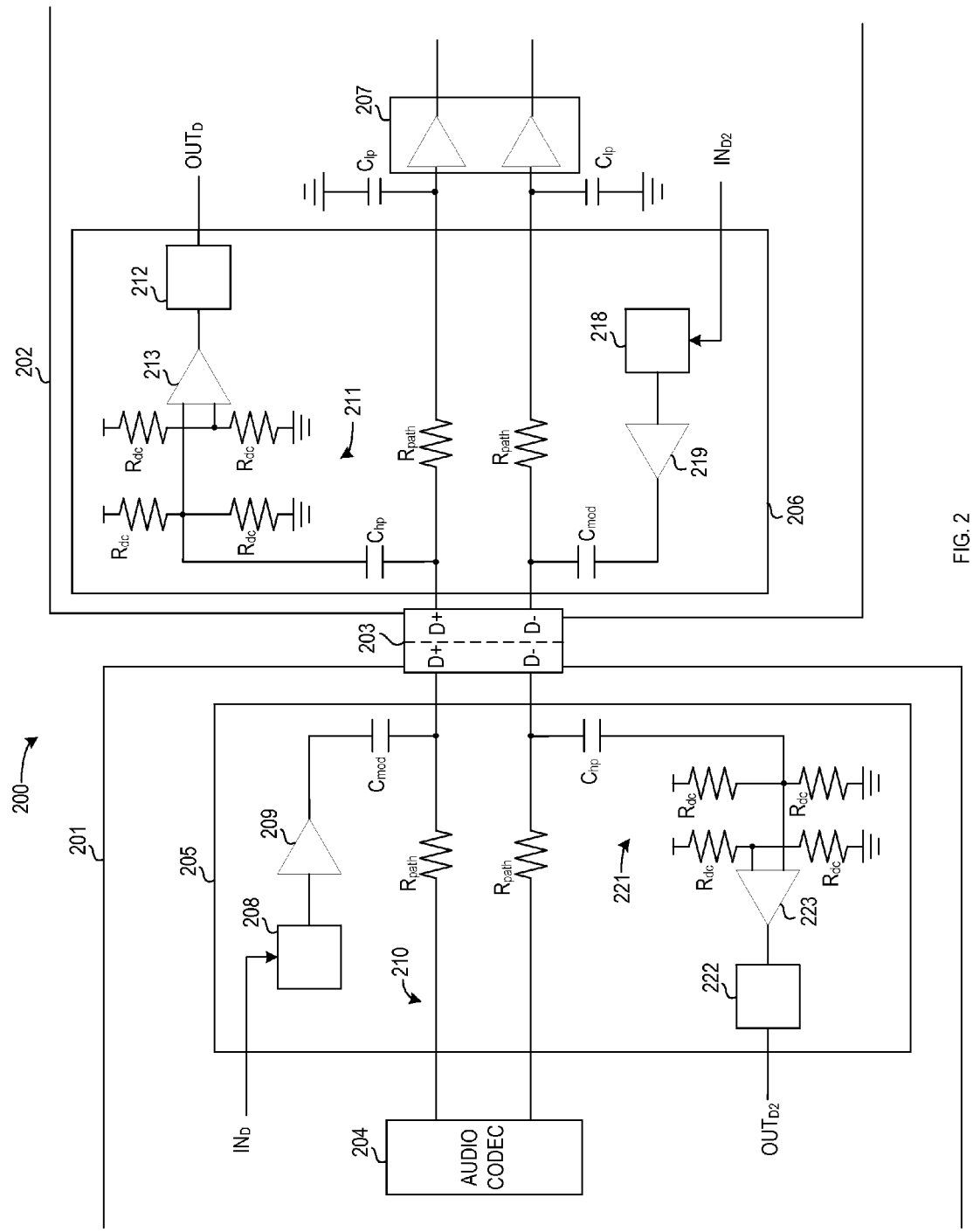
FIG. 2 illustrates generally an example system to transmit data with an audio signal without causing significant distortion to the audio signal.

FIG. 2 illustrates generally an example system 200 to transmit data ($IN_D$) with an audio signal without causing significant distortion to the audio signal. The system 200 can include a first electronic device 201 and a second electronic device 202 coupled together using a wired connector 203 such as a USB connector having a D+ conductor and a D− conductor. It is understood that other types of wired connection can be used with the system of FIG. 2 without departing from the scope of the present subject matter. In certain examples, the first electronic device 201 can be an audio master device and can include an audio codec 204, and a first circuit 205 for integrating data with an audio signal generated using the audio codec 204. In certain examples, the second electronic device 202 can be an audio receiver device such as a device for broadcasting, saving or processing received analog audio signals. In some examples, the second electronic device 202 can include a second circuit 206 for separating data from a received analog audio signal and driving audio amplifiers 207 to broadcast the sound of the audio signal.

In certain examples, the audio codec 204 can generate an audio signal on an audio channel 210 of the first electronic device 201 and can transmit the audio signal to the first circuit 205. In some examples the audio signal can be biased. In some examples, the audio signal is not biased. A frequency modulator 208 of the first circuit 205 can receive digital data ($IN_D$) and can convert the digital data ($IN_D$) to an analog data signal having two distinct frequencies. In certain examples, a first frequency can denote a low logic signal such as a "zero", and a second frequency can denote a high logic signal such as a "one". In certain examples, the second frequency is higher than the first frequency. In some examples, the first frequency is higher than the second frequency. In some examples, the analog data signal can include a square-wave waveform having two distinct frequencies. In some examples, a transmitter amplifier 209 can provide the analog data signal with a sine-wave waveform having two distinct frequencies. In an example, the first circuit 205 can superimpose the analog data signal in the form of a frequency shift key (FSK) scheme onto a first conductor associated with the analog channel 210 using the transmitter amplifier 209 and an AC coupling capacitance ($C_{mod}$). In certain examples, the first conductor can include the negative data line (D−) of a USB interface.

In certain examples, the second circuit 206 of the second electronic device 202 can receive digital data superimposed on an analog signal. In some examples, the second circuit 206 can receive the combined signal using a USB interface coupled to the USB interface associated with the first circuit 201. In certain examples, the second circuit 206 can include a high pass filter 211 and at least a portion ($R_{path}$) of a low pass filter to separate an analog data signal from the audio signal. The second circuit 206 can include a frequency detector 222 to reconstruct digital data from the analog data signal. In certain examples, the high pass filter 211 can pass an analog sine wave data signal to a comparator 213 to convert the sine-wave to a square-wave having two distinct frequencies representing the original digital data. The comparator 213 can then pass the square-wave signal to the frequency detector 222 to reconstruct the digital data signal ($OUT_D$, e.g., $IN_D$). In an example, the high pass filter 211 can include a high pass capacitance ($C_{hp}$) and a high pass resistance ($R_{dc}$). In an example, the comparator 213 can include a differential comparator such as a 50 MHz differential comparator in some examples.

In certain examples, the low pass filter ($R_{path}$, $C_{lp}$) can separate analog audio signals from the combined data and audio signal. In some examples, the low pass filter ($R_{path}$, $C_{lp}$) can pass analog audio signals having a frequency lower than 22 kHz. In an example, the low pass filter ($R_{path}$, $C_{lp}$) can include a low pass filter capacitance ($C_{lp}$) and a low pass filter resistance ($R_{path}$). In certain examples, the low pass filter ($R_{path}$, $C_{lp}$) can pass analog audio signals to one or more audio amplifiers 207 for broadcast using an audio transducer (not shown).

In certain examples, the second circuit 206 can include a frequency modulator 218, transmitter amplifier 219 and AC coupling capacitance ($C_{mod}$) to receive a digital data signal ($IN_{D2}$), to convert the digital data signal ($IN_{D2}$) to an analog data signal having two distinct frequencies, and to superimpose the data in the form of a frequency shift key (FSK) scheme onto an analog signal line, such as a positive data line (D+) of a USB interface.

In certain examples, the first circuit 205 can receive a signal including superimposed data on an analog signal. In some examples, the first chip 205 can include a high pass filter 221 and at least a portion of a low pass filter ($R_{path}$) to separate the analog data signal from the analog audio signal. In an example, the high pass filter 221 can include a high pass capacitance ($C_{hp}$) and a high pass resistance ($R_{dc}$). The first circuit 205 can include a frequency detector 222 to reconstruct a digital data signal ($OUT_{D2}$) from the analog data signal. In certain examples, the high pass filter 221 can pass the analog data signal in the form of a sine-wave to a comparator 223. The comparator 223 can convert the sine wave to a square wave signal for further processing of the data included in the combined data and analog signal. In an example, the comparator 223 can include a differential comparator such as a 50 MHz differential comparator in some examples.

In certain examples, the frequencies used to transmit the analog data signals can be significantly higher than of the audible range of frequencies for human beings. Using such frequencies can significantly reduce the total harmonic distortion (THD) of the audio signal compared to existing methods of superimposing data signal on analog audio signal. For example, using a 1 volt RMS, either 12 Mhz or 18 MHz transmission sine and square wave can result in THD of less than about 0.00035% over the typical audible frequency range of 20 Hz to 20 kHz. In another example, using a 500 mV peak-peak 12 MHz or 18 MHz transmission sine and square wave can result in THD of less than about 0.00012% over the typical audible frequency range of 20 Hz to 20 kHz. In certain examples, a square wave superimposition scheme can reduce hardware costs while providing data during audio transmission and limiting total harmonic distortion to a level undetectable by most users listening to the broadcast of the audio transmission.

Additional Notes

In Example 1, an apparatus can include an audio channel, a capacitor coupled to a first conductor of the audio channel, the capacitor configured to couple an analog representation of a digital data signal with an analog audio signal on the audio channel; and a frequency modulator configured to receive the digital data signal and to modulate a frequency of an output signal of the frequency modulator based on a logic level of the digital data signal, wherein the analog representation of the digital data signal includes the frequency of the output signal of the frequency modulator.

In Example 2, the output signal of the frequency modulator of Example 1 optionally includes a square waveform.

In Example 3, the apparatus of any one or more of Examples 1-2 optionally includes a transmitter amplifier configured to receive the square waveform and to provide a sinusoidal waveform.

In Example 4, the frequency of the output signal of any one or more of Examples 1-3 optionally is greater than 20 kHz.

In Example 5, the frequency of the output signal of any one or more of Examples 1-4 optionally is greater than 1 MHz.

In Example 6, the apparatus of any one or more of Examples 1-5 optionally includes a high-pass filter coupled to a second conductor of the audio channel and configured to pass a representation of a second digital signal, and a frequency detector configured to receive the representation of the second digital signal and provide a copy of the second digital signal;

In Example 7, the apparatus of any one or more of Examples 1-6 optionally includes a high-pass filter coupled to a second conductor of the audio channel and configured to pass a sinusoidal representation of a second digital signal, a comparator configured to receive the sinusoidal representation of the second digital signal and to provide a square-wave representation of the second digital signal, and a frequency detector configured to receive the square-wave representation of the second digital signal and provide a copy of the second digital signal.

In Example 8, the audio channel of any one or more of Examples 1-7 optionally includes an output audio channel.

In Example 9, the audio channel of any one or more of Examples 1-7 optionally includes an input audio channel, and the apparatus of any one or more of Examples 1-7 optionally includes a low pass filter configured to pass the audio signal received from a host audio channel to an audio amplifier.

In Example 10, the apparatus of any one or more of Examples 1-9 optionally includes a Universal Serial Bus (USB) port, wherein the audio channel includes one or more conductors of the USB port.

In Example 11, a method can include receiving a digital data signal at a frequency modulator, converting a first logic level of the digital data signal to a first frequency using the frequency modulator, converting a second logic level of the digital data signal to a second frequency using the frequency modulator, wherein an analog representation of the digital data signal includes the first frequency and the second frequency, and coupling the analog representation of the digital data signal to an audio channel using a modulating capacitor and a first conductor of the audio channel to provide a modulated audio signal.

In Example 12, the converting the first logic level and the converting the second logic level of any one or more of Examples 1-11 optionally includes providing a square-wave representation of the digital data signal having the first frequency and the second frequency.

In Example 13, the method of any one or more of Examples 1-12 optionally includes converting the square wave representation of the digital data signal to a sinusoidal representation of the digital data signal using an transmitter amplifier.

In Example 14, the method of any one or more of Examples 1-13 optionally includes receiving an audio signal on the audio channel from an audio codec and providing the modulated audio signal on the audio channel to a second device.

In Example 15, the method of any one or more of Examples 1-14 optionally includes receiving an analog representation of a second digital signal on a second conductor of the audio channel.

In Example 16, the method of any one or more of Examples 1-15 optionally includes passing the representation of the second digital signal to frequency detector using a high pass filter coupled to the second conductor of the audio channel, and providing a copy of the second digital signal using the frequency detector.

In Example 17, the providing a copy of the second digital signal of any one or more of Examples 1-16 optionally includes providing a first logic level at the output of the frequency detector when a first frequency is detected in the representation of the second digital signal, and providing a second logic level at the output of the frequency detector when a second frequency is detected in the representation of the second digital signal.

In Example 18, the first and second frequencies of any one or more of Examples 1-18 optionally are greater than 20 kHz.

In Example 19, the method of any one or more of Examples 1-18 optionally includes receiving a modulated audio signal at a low-pass filter coupled to the audio channel to provide the audio signal to an amplifier; the amplifier configured to provide an amplified audio signal for playing sound using a speaker.

In Example 20, a system can include a first chip configured to transmit data superimposed on an analog signal using a first conductor, a second chip configured to separate the data from the analog signal, wherein the first chip is configured to convert the data to a sine wave including a first frequency representing a digital low logic level and a second frequency representing a digital high logic signal, and wherein the first and second frequencies are greater than 20 kHz.

In Example 21, the first chip of any one or more of Examples 1-20 optionally is coupled to a first Universal Serial Bus (USB) compatible port, the second chip of any one or more of Examples 1-20 optionally is coupled to a second USB-compatible port, and the first USB-compatible port of any one or more of Examples 1-20 optionally is physically coupled to the second USB-compatible port.

In Example 22, the second chip of any one or more of Examples 1-21 optionally is configured to transmit second data superimposed on the analog signal using a second conductor, the first chip of any one or more of Examples 1-22 optionally is configured to separate the second data from the analog signal, and the second chip of any one or more of Examples 1-21 optionally is configured to convert the data to a second sine wave including the first frequency representing the digital low logic level and the second frequency representing the digital high logic signal.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
an audio channel;
a capacitor coupled to a first conductor of the audio channel, the capacitor configured to couple an analog representation of a digital data signal with an analog audio signal on the audio channel;
a frequency modulator configured to receive the digital data signal and to modulate a frequency of an output signal of the frequency modulator based on a logic level of the digital data signal, wherein the analog representation of the digital data signal includes the frequency of the output signal of the frequency modulator and wherein the output signal of the frequency modulator includes a square waveform; and
a transmitter amplifier configured to receive the square waveform and to provide a sinusoidal waveform.

2. The apparatus of claim 1, wherein the frequency of the output signal is greater than 20 kHz.

3. The apparatus of claim 1, wherein the frequency of the output signal is greater than 1 MHz.

4. The apparatus of claim 1, including:
a high-pass filter coupled to a second conductor of the audio channel and configured to pass a representation of a second digital signal; and
a frequency detector configured to receive the representation of the second digital signal and provide a copy of the second digital signal.

5. The apparatus of claim 1, including:
a high-pass filter coupled to a second conductor of the audio channel and configured to pass a sinusoidal representation of a second digital signal;
a comparator configured to receive the sinusoidal representation of the second digital signal and to provide a square-wave representation of the second digital signal; and
a frequency detector configured to receive the square-wave representation of the second digital signal and provide a copy of the second digital signal.

6. The apparatus of claim 1, wherein the audio channel includes an output audio channel.

7. The apparatus of claim 1, wherein the audio channel includes an input audio channel; and
the apparatus includes a low pass filter configured to pass the audio signal received from a host audio channel to an audio amplifier.

8. The apparatus of claim 1, including a Universal Serial Bus (USB) port, wherein the audio channel includes one or more conductors of the USB port.

9. A method comprising:
receiving a digital data signal at a frequency modulator;
converting a first logic level of the digital data signal to a first frequency using the frequency modulator;
converting a second logic level of the digital data signal to a second frequency using the frequency modulator;
wherein an analog representation of the digital data signal includes the first frequency and the second frequency,
coupling the analog representation of the digital data signal to an audio channel using a modulating capacitor and a first conductor of the audio channel to provide a modulated audio signal;
wherein the converting the first logic level and the converting the second logic level includes providing a square-wave representation of the digital data signal having the first frequency and the second frequency; and
wherein the method includes converting the square wave representation of the digital data signal to a sinusoidal representation of the digital data signal using a transmitter amplifier.

10. The method of claim 9, including receiving an audio signal on the audio channel from an audio codec and providing the modulated audio signal on the audio channel to a second device.

11. The method of claim 9, including receiving an analog representation of a second digital signal on a second conductor of the audio channel.

12. The method of claim 11, including passing the representation of the second digital signal to frequency detector using a high pass filter coupled to the second conductor of the audio channel; and
providing a copy of the second digital signal using the frequency detector.

13. The method of claim 12, wherein providing a copy of the second digital signal includes:
providing a first logic level at the output of the frequency detector when a first frequency is detected in the representation of the second digital signal; and
providing a second logic level at the output of the frequency detector when a second frequency is detected in the representation of the second digital signal.

14. The method of claim 13, wherein the first and second frequency are greater than 20 kHz.

15. The method of claim 9, including receiving a modulated audio signal at a low-pass filter coupled to the audio channel to provide the audio signal to an amplifier; the amplifier configured to provide an amplified audio signal for playing sound using a speaker.

16. A system comprising:
a first chip configured to transmit data superimposed on an analog signal using a first conductor;
a second chip configured to separate the data from the analog signal;
wherein the first chip is configured to convert the data to a sine wave including a first frequency representing a digital low logic level and a second frequency representing a digital high logic signal; and
wherein the first chip includes:
a capacitor coupled to the first conductor, the capacitor configured to couple an analog representation of the data with the analog audio signal;
a frequency modulator configured to receive the data and to modulate a frequency of an output signal of the frequency modulator based on a logic level of the data, wherein the analog representation of the data includes the frequency of the output signal of the frequency modulator and wherein the output signal of the frequency modulator includes a square waveform; and
a transmitter amplifier configured to receive the square waveform and to provide the sine wave.

17. The system of claim 16, wherein the first chip is coupled to a first Universal Serial Bus (USB) compatible port;
   wherein the second chip is coupled to a second USB-compatible port; and
   wherein the first USB-compatible port is physically coupled to the second USB-compatible port.

18. The system of claim 16, wherein the second chip is configured to transmit second data superimposed on the analog signal using a second conductor;
   wherein the first chip is configured to separate the second data from the analog signal; and
   wherein the second chip is configured to convert the data to a second sine wave including the first frequency representing the digital low logic level and the second frequency representing the digital high logic signal.

* * * * *